Oct. 14, 1924.  
V. ZBORIL  
1,511,928  
STRIDING MOTION DRIVING GEAR FOR MOTOR VEHICLES  
Filed Aug. 22, 1922   2 Sheets-Sheet 1

Inventor  
Václav Zboril,  
by

Oct. 14, 1924.          1,511,928
V. ZBORIL
STRIDING MOTION DRIVING GEAR FOR MOTOR VEHICLES
Filed Aug. 22, 1922          2 Sheets-Sheet 2
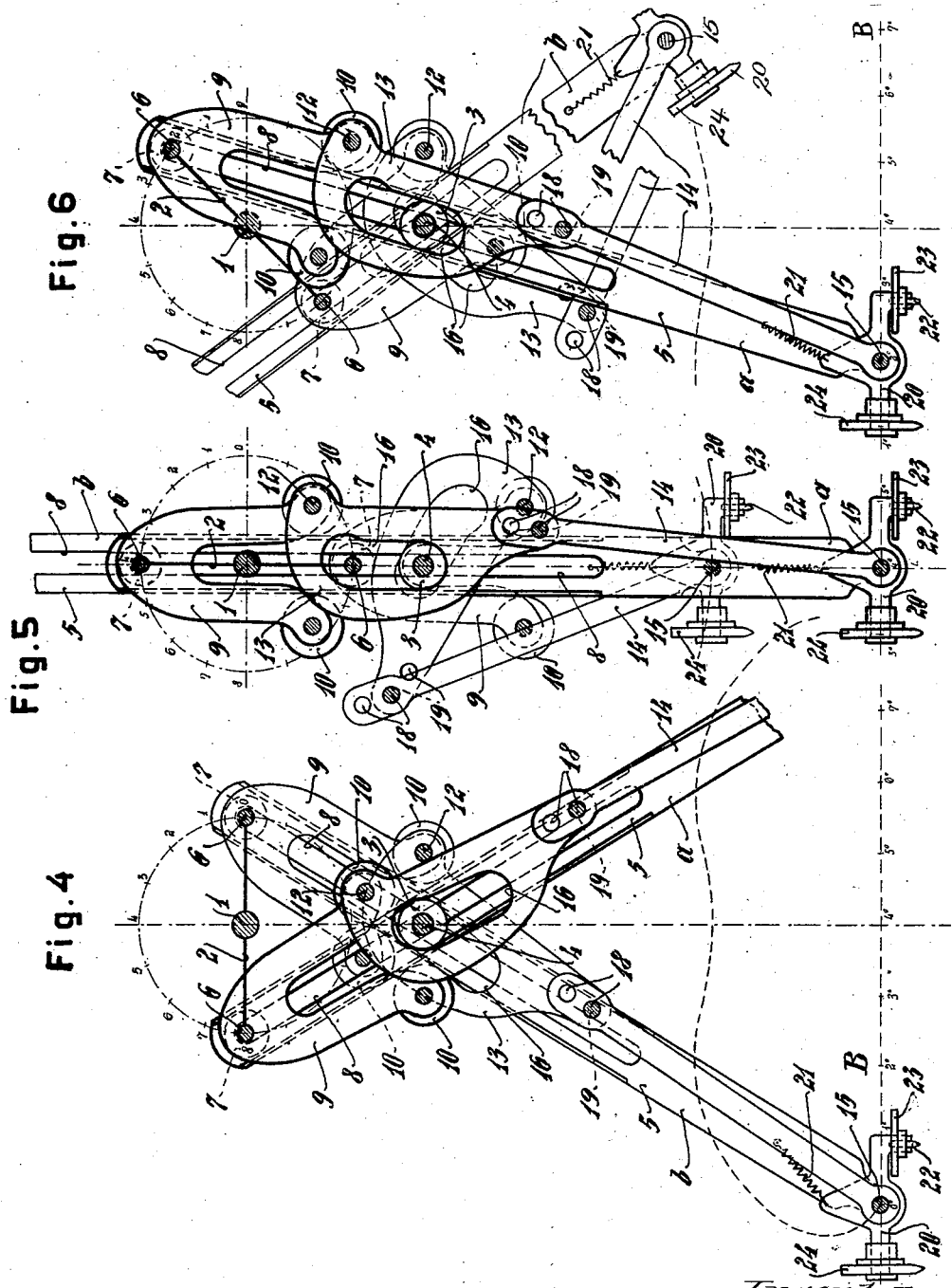
Inventor
Václav Zboril
By 
Attorney Patented Oct. 14, 1924.

1,511,928

UNITED STATES PATENT OFFICE.

VÁCLAV ZBORIL, OF BYSTRITZ, CZECHOSLOVAKIA.

STRIDING-MOTION DRIVING GEAR FOR MOTOR VEHICLES.

Application filed August 22, 1922. Serial No. 583,644.

*To all whom it may concern:*

Be it known that I, VÁCLAV ZBORIL, a citizen of the Republic of Czechoslavakia, and residing at Bystritz a. Hostein, in the State of Czechoslovakia, have invented certain new and useful Improvements in a Striding-Motion Driving Gear of Motor Vehicles, of which the following is a specification.

This invention relates to a driving gear for motor vehicles with striding levers moved by means of cranks and is characterized by the fact that the levers which execute the striding movements serve as carrying members for the vehicle, so that the usual wheels are dispensed with. In the movement of the striding levers the rotary motion of the driving crank is converted into a horizontal and practically uniform motion of the ends of the levers which form the feet.

For the purpose just indicated the striding levers, which are connected with devices by means of which they are elevated and depressed, slide on a guide roller, the axis of which is arranged beneath the lowest point of the crank circle at a distance equivalent to about one-third of the diameter of said circle, while the distance of the crank axle from the ground is equivalent to approximately three times the diameter of the crank circle. Thus the normal stride of the levers for one-half revolution of the crank amounts to approximately five and two-tenths times the length of the crank.

In the accompanying drawing:—

Figs. 4, 5 and 6 illustrate the manner in which one of the striding levers is moved upon rotation of the crank, the feet being omitted.

Figures 1, 2, 3:
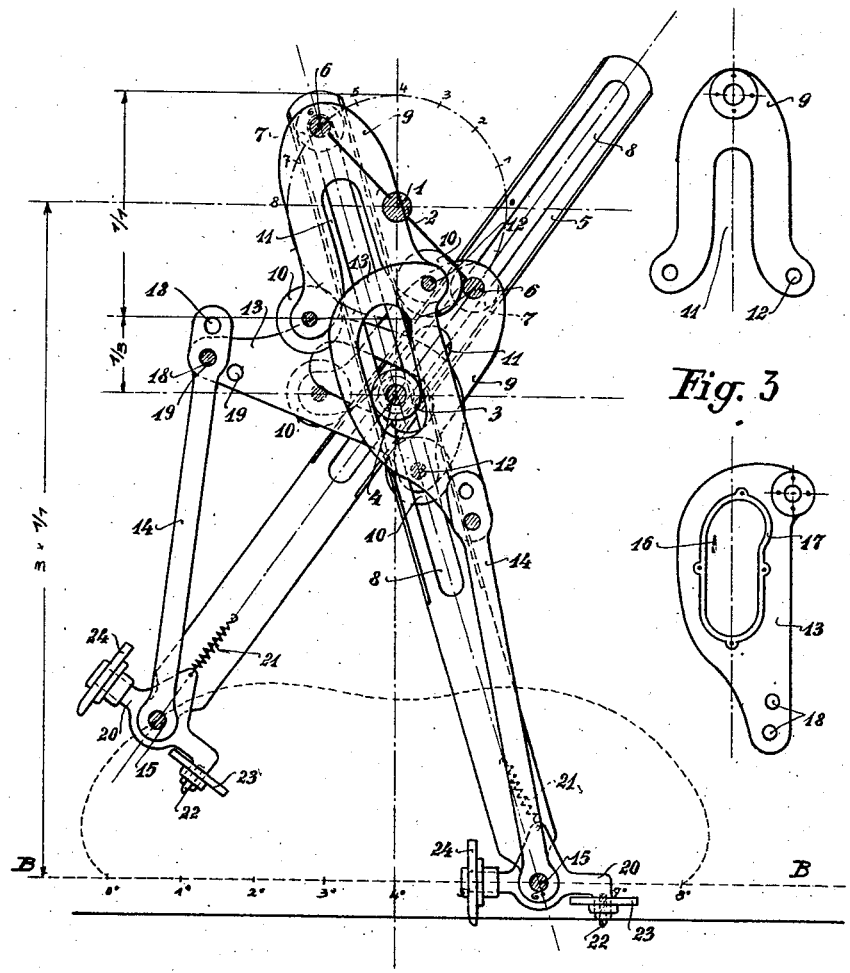
Figure 1 shows by way of example, one constructional form of the subject of the application.
Figure 2 is a plan view of one of the slide pieces for the guide rollers on which the striding levers are guided.
Figure 3 is a plan view of the upper member of one of the toggle levers which are interposed between the slide pieces and the lower ends of the striding levers.

4 designates the axle of the vehicle upon which, in ordinary vehicles, the wheels are mounted. Guide rollers 3, on which striding levers 5 are guided, are mounted to rotate on the axle 4. The striding levers 5 preferably are double T-shape in cross-section and are guided by means of narrow guide-slots 8, which also serve to guide the pins 6 of a pair of cranks 2 which work at 180° apart, and guide rollers 7, which are rotatably mounted on said pins 6, run in the flanges on the opposite sides of the striding levers.

In the driving gears for motor vehicles heretofore known, wherein striding levers are actuated by means of cranks, the axle of the driving crank lies below the axle of the vehicle, so that the crank pins act on the striding lever between the axle of the vehicle and the ground, which effects only a relatively short striding motion. According to the present invention, however, the axle 1 of the driving crank 2 is arranged above the axle 4 of the vehicle in such manner that the distance of the crank axle 1 from the ground line B—B is approximately equal to the periphery of the crank circle, and the lowermost point of the crank circle lies at a distance equal to approximately one-third of the diameter of said circle above the axle 4 of the guide roller 3.

For elevating and depressing each striding lever 5, there is used a slide-piece 9 (Figure 2), which is pivotally connected to the crank pin 6 and is guided by means of two rollers 10 on the outer flanges of the striding lever, on which it can consequently only move longitudinally.

An aperture 11 in the form of a slot in the slide piece receives the roller 3. At 12 there is coupled to this slide piece the upper arm 13 (Fig. 3) of a toggle lever 13, 14, the lower arm 14 of which is pivotally connected to the lower end of the striding lever by means of a pin 15. The upper arm 13 of the toggle lever is guided by means of its guide slot 16 on the roller 3.

In order to secure the edges of the guide slot against premature wear, they are strengthened by interchangeable steel strips 17, which arrangement can be advantageously provided on all joints or bearings of the toggle lever arms 14 and 13, and also of the slide piece 9 and the striding lever 5.

Each of the toggle levers 13 and 14 has a pair of holes 18 and 19 adjacent its end to receive a pivot pin for connecting the levers together. The holes 18 and 19 are at different distances apart in the adjacent levers 13 and 14, so that the stroke of the striding lever can be regulated as required by shortening or lengthening the two toggle lever arms.

The pin 15, which connects the striding lever 5 with the lower end of the lower arm 14 of the toggle lever, also serves for the attachment to the striding lever of pivotally mounted supporting feet 20, which are connected by means of elastic tension members 21 to the corresponding striding levers. The supporting feet are each provided at the rear with a calk 22 capable of being unscrewed, and with a plate 23 to prevent sinking into soft ground, whilst they are provided at the front with an interchangeable plate 24 to permit a secure grip of the vehicle in the ground during the propulsion of the vehicle.

The operation of the device is as follows: As may be seen from Figures 1, 4, 5 and 6, both the driving motion and the conversion of the circular into a horizontal uniform motion of the ends of the striding levers forming the feet is exclusively effected from the crank itself.

When the crank 2 is in horizontal position (Figure 4), the striding element $a$ shown in heavy lines, is already on the ground with its ends forming the feet while the striding element $b$, shown in thin lines, which is guided by the opposite crank-pin 6, is still on the ground. In this position the several parts of the striding members are stretched as far as possible, that is to say, the slide piece 9 is so high on the striding lever 5 that the two toggle lever arms 13 and 14 are in a stretched position on the striding lever, thereby enabling the striding member to carry the weight of the vehicle and at the same time to move it forward; this lasts while the upper half of the crank circle is run through.

If the crank is moved upward for 45° in clockwise rotation, the striding members assume the position shown in Figure 1. The left crank-pin 6 is moved from point 8 of the crank circle to point 6 thereof and the foot end 15 of the striding member $a$ has at the same time made its horizontal movement from point 8° to point 6° of the ground line B B.

The crank having again turned for 45° (Fig. 5) the striding member $a$ has reached the vertical line formed by the crank axle 1 and the axle 4 of the vehicle and when the crank is moved again for 45° (Fig. 6), the striding member $a$ rests upon point 2° of the ground line B B and when the crank has passed through the upper part of the circle, will be in the position of the striding member $b$ shown in thin lines in Figure 4.

While the crank is moved through the lower half of its circle the striding levers are lifted and rocked into operative position again. As soon as the crank-pin 6 is moved downward from the horizontal line for 45° the slide piece 9 attached thereto has been guided downward along the striding lever 5 (Fig. 1) and has swung the upper toggle lever arm 13 with its slot 16 round the guide roller 3 on the axle of the vehicle, so that it will be tilted and will lift the striding lever 5 from the ground by means of the toggle lever arm 14. This lifting action is continued in the next position (Figure 5) and passes from the position shown in Fig. 6 in thin lines into the position shown in heavy lines in Fig. 4, in which the striding lever is again put on the ground.

The length of the stride amounts to about five and two-tenths times the length of the crank, the vehicle during the movement remains exactly in its horizontal position without being provided with any special compensating devices. Two equal lengths (0—8) completed by the crank-pin correspond equal distances (0°—8°) passed by the end of the foot, so that a uniform progressive movement of the vehicle is obtained.

I claim:

1. A driving gear for motor vehicles, having striding levers each moved by means of a driving crank and in which the said levers serve as exclusive carrying members for the vehicle, devices connected to said levers for elevating and depressing them, a guide roller on which said levers slide, the axle of which is arranged a distance approximately equal to one-third of the diameter of the crank circle beneath the lowest point of such circle, while the distance of the crank axle from the ground corresponds approximately to three times the diameter of the crank circle.

2. A driving gear for motor vehicles, having striding levers moved by means of a driving crank and in which the said levers serve as exclusive carrying members for the vehicle, a toggle lever associated with each striding lever having upper and lower arms, said toggle levers having guide slots therein and being mounted on the striding lever, a guide roller operating in said slots, a member slidable on the striding levers to which said upper arm is pivotally connected, said member being pivoted by a pin to the driving crank, the lower arm of said toggle being pivotally connected to the striding lever.

3. A driving gear for motor vehicles having striding levers with guide slots therein, said levers being moved by means of driving cranks and serving as exclusive carrying members for the vehicle, a toggle lever associated with each striding lever having upper and lower arms, said toggle lever having a guide slot therein and being mounted on the striding lever, a guide roller operating in said slot, a striding lever slide slidable on the striding lever to which said upper arm is pivotally connected, said lever slides being pivoted by a pin to the driving crank, the pin of the driving crank moving the striding lever slides in the upper part of the guide slot in this lever, an axle projecting into the guide slot of each striding lever at a point beneath the circular path of the driving crank, a guide roller on each axle riding in said slot, the lower arm of said toggle being pivotally connected to the striding lever.

4. A driving gear for motor vehicles having striding levers with guide slots therein, said levers being moved by means of driving cranks and serving as exclusive carrying members for the vehicle, a toggle lever associated with each striding lever having upper and lower arms, said lever having a guide slot therein and being mounted on the striding lever, a guide roller operating in said slot, a striding lever slide slidable on the striding lever to which said upper arm is pivotally connected, said lever slide being pivoted by a pin to the driving crank, the pin of the driving crank moving the striding lever slides in the upper part of the guide slot in this lever, an axle projecting into the guide slot of each striding lever at a point beneath the circular path of the driving crank, a guide roller on each axle riding in said slot, the lower arm of said toggle being pivotally connected to the striding lever, and means for adjusting the length of stroke of the striding lever.

5. A driving gear for motor vehicles having striding levers with guide slots therein, said levers being moved by means of driving cranks and serving as exclusive carrying members for the vehicle, a toggle lever associated with each striding lever having upper and lower arms, said lever having a guide slot therein and being mounted on the striding lever, a guide roller operating in said slot, a striding lever slide slidable on the striding lever and to which said upper arm is pivotally connected, said lever slide being pivoted by a pin to the driving crank, the pin of the driving crank moving the striding lever slide in the upper part of the guide slot in this lever, an axle projecting into the guide slot of each striding lever at a point beneath the circular path of the driving crank, a guide roller on each axle riding in said slot, the lower arms of said toggle being pivotally connected to the striding lever, means for adjusting the length of stroke of the striding lever, pivotally mounted supporting feet having a calk capable of being unscrewed and with a plate to prevent sinking into soft ground, said feet being also provided at the front with an interchangeable plate.

In testimony whereof I affix my signature in the presence of two witnesses.

VÁCLAV ZBORIL.

Witnesses:
 THOMAS GUNDRICH,
 JOSEPH CALKA.